(12) United States Patent
Chen et al.

(10) Patent No.: US 11,947,358 B2
(45) Date of Patent: Apr. 2, 2024

(54) OBSTACLE SELF-LEARNING METHOD AND NEW OBSTACLE SELF-LEARNING METHOD

(71) Applicant: ZHEJIANG YAT ELECTRICAL APPLIANCE CO., LTD, Zhejiang (CN)

(72) Inventors: Yong Chen, Zhejiang (CN); Jianfei Gong, Zhejiang (CN); Fengwu Chen, Zhejiang (CN); Zhe Zhang, Zhejiang (CN)

(73) Assignee: ZHEJIANG YAT ELECTRICAL APPLIANCE CO., LTD, Zhejiang (CN)

( * ) Notice: Subject to any disclaimer, the term of this patent is extended or adjusted under 35 U.S.C. 154(b) by 912 days.

(21) Appl. No.: 16/967,148

(22) PCT Filed: May 30, 2019

(86) PCT No.: PCT/CN2019/089205
§ 371 (c)(1),
(2) Date: Aug. 4, 2020

(87) PCT Pub. No.: WO2019/228438
PCT Pub. Date: Dec. 5, 2019

(65) Prior Publication Data
US 2020/0356105 A1   Nov. 12, 2020

(30) Foreign Application Priority Data

Jun. 1, 2018   (CN) .......................... 201810556614.6

(51) Int. Cl.
*A47L 11/40*      (2006.01)
*G05D 1/00*       (2006.01)
(Continued)

(52) U.S. Cl.
CPC ......... *G05D 1/0221* (2013.01); *G05D 1/0219* (2013.01); *G06N 5/04* (2013.01); *G06N 20/00* (2019.01); *G05D 1/0088* (2013.01)

(58) Field of Classification Search
None
See application file for complete search history.

(56) References Cited

U.S. PATENT DOCUMENTS

2019/0129433 A1   5/2019  Xiao et al.

FOREIGN PATENT DOCUMENTS

| CN | 104035444 A | 9/2014 |
| CN | 105843222 A | 8/2016 |

(Continued)

OTHER PUBLICATIONS

International Search Report for PCT/CN2019/089205 dated Sep. 6, 2019, ISA/CN.

*Primary Examiner* — Adam D Tissot
*Assistant Examiner* — Laura E Linhardt
(74) *Attorney, Agent, or Firm* — Yue (Robert) Xu; Apex Attorneys at Law, LLP

(57) ABSTRACT

A self-learning method for an obstacle and a self-learning method for a new obstacle are provided. With the self-learning method, in step 1, data of a grid map in a movement region is acquired, and each of grids of the grid map is marked as not being traversed. In step 2, a starting grid of the grid map is set, data of the starting grid is pushed into a stack, a movement unit is controlled to move to the starting grid, and the starting grid is remarked as being traversed. In step 3, the movement unit is controlled to traverse the grid map, and boundary data of the obstacle is acquired based on marks of the grids in the grid map. In step 4, boundary data of the obstacle is stored.

7 Claims, 3 Drawing Sheets

(51) Int. Cl.
*G05D 1/02* (2020.01)
*G06N 5/04* (2023.01)
*G06N 20/00* (2019.01)

(56) References Cited

FOREIGN PATENT DOCUMENTS

| | | | | | |
|---|---|---|---|---|---|
| CN | 106843216 | A | * | 6/2017 | ............. G05D 1/024 |
| CN | 106843216 | A | | 6/2017 | |
| CN | 107340768 | A | | 11/2017 | |
| CN | 108803602 | A | | 11/2018 | |
| JP | 2015223956 | A | | 12/2015 | |
| KR | 101452437 | B1 | | 11/2014 | |

\* cited by examiner

OBSTACLE SELF-LEARNING METHOD AND NEW OBSTACLE SELF-LEARNING METHOD

The present application is the national phase of International Patent Application No. PCT/CN2019/089205, titled "OBSTACLE SELF-LEARNING METHOD AND NEW OBSTACLE SELF-LEARNING METHOD", filed on May 30, 2019, which claims priority to Chinese Patent Application No. 201810556614.6, titled "OBSTACLE SELF-LEARNING METHOD AND NEW OBSTACLE SELF-LEARNING METHOD", filed on Jun. 1, 2018 with the National Intellectual Property Administration, PRC, both of which are incorporated herein by reference in their entireties.

FIELD

The present disclosure relates to the technical field of intelligent robots, and in particular to a self-learning method for an obstacle and a self-learning method for a new obstacle.

BACKGROUND

In order to realize an autonomous operation function of a lawn mowing robot, it is required to acquire information about an obstacle in the operation environment, so as to avoid the lawn mowing robot from colliding with the obstacle. The information about the obstacle may be acquired mainly in the following two ways: acquiring the information in a pre-teaching manner; and acquiring the information by a sensor in real-time. The way of acquiring the information about the obstacle in the pre-teaching manner has the following disadvantages: a teaching process is complex, resulting in inconvenience for users; it cannot adapt to changing environment, and once a new obstacle appears, it has to perform teaching again. The way of acquiring information about the obstacle by a sensor in real time has the following disadvantages: it is required to plan the path dynamically, resulting in reduced mowing efficiency and incomplete mowing.

SUMMARY

To solve the above problems, a self-learning method for an obstacle and a self-learning method for a new obstacle are provided in the present disclosure, with which boundary data of an obstacle can be acquired automatically without providing boundary information of the obstacle externally, and the boundary data of the obstacle can be stored once being acquired.

The self-learning method for an obstacle includes the following steps 1 to 3.

In step 1, data of a grid map in a movement region is acquired, and each of grids of the grid map is marked as not being traversed.

In step 2, a starting grid of the grid map is set, data of the starting grid is pushed into a stack, a movement unit is controlled to move to the starting grid, and the starting grid is remarked as being traversed.

In step 3, the movement unit is controlled to traverse the grid map, and boundary data of the obstacle is acquired based on marks of the grids in the grid map, where each time one of the grids is traversed, data of the grid is pushed into the stack, the grid is remarked as being traversed.

In step 4, the boundary data of the obstacle is stored.

Preferably, step 3 includes the following steps 3-1 to 3-4.

In step 3-1, the marks of the grids are checked sequentially by taking a grid corresponding to a top of the stack as a center. In a case that a grid is marked as not being traversed, the movement unit is controlled to move to the grid, and the method proceeds to step 3-2. In a case that none of the grids is marked as not being traversed, an element at the top of the stack is popped. If the number of elements in the stack is zero, a traversal for the movement region is completed, and the method proceeds to step 4. If the number of the elements in the stack is not zero, the method proceeds to step 3-3.

In step 3-2, in a case that no collision occurs during a movement of the movement unit to the grid that is checked as not being traversed in step 3-1, the grid is remarked as being traversed, data of the grid is pushed into the stack, and step 3-1 is performed. In a case that a collision occurs during the movement of the movement unit to the grid that is checked as not being traversed in step 3-1, the grid is remarked as an obstacle, the movement unit is controlled to return to a previous grid, and step 3-1 is performed.

In step 3-3, marks of an upper grid, a lower grid, a left grid, and a right grid of the grid corresponding to the top of the stack are checked by taking the grid corresponding the top of the stack as a center. In a case that there is a grid that is checked as not being traversed, the method proceeds to step 3-4. In a case that none of the grids is checked as not being traversed, an element at the top of the stack is popped. If the number of elements in the stack is zero, a traversal for the movement region is completed, and the method proceeds to step 4. If the number of the elements in the stack is not zero, the method proceeds to step 3-3.

In step 3-4, an obstacle-free path from a grid where the movement unit is located to the grid corresponding to the top of the stack is determined.

Preferably, step 3-4 includes the following steps 3-4-1 to 3-4-3.

In step 3-4-1, marks of an upper grid, a lower grid, a left grid, and a right grid of the grid where the movement unit is located are checked by taking the grid where the movement unit is located as a center, for each grid of the upper grid, the lower grid, the left grid, and the right grid that is marked as being traversed, step 3-4-2 is performed.

In step 3-4-2, in a case that the grid that is checked in step 3-4-1 corresponds to the top of the stack, the obstacle-free path from the grid where the movement unit is located to the grid corresponding to the top of the stack is determined, and the method proceeds to step 3-4-3. In a case that the grid that is checked in step 3-4-1 does not corresponds to the top of the stack, marks of an upper grid, a lower grid, a left grid, and a right grid of the grid that is checked in step 3-4-1 are checked by taking the grid that is checked in step 3-4-1 as a center, for each grid of the upper grid, the lower grid, the left grid, and the right grid of the grid that is marked as being traversed, step 3-4-2 is performed.

In step 3-4-3, the movement unit is controlled to move to the grid corresponding to the top of the stack along the obstacle-free path, and the method returns to step 3-1.

A self-learning method for a new obstacle is further provided in the present disclosure. The method includes the following steps 1 to 5.

In step 1, the movement unit is controlled to move to a next operation grid along a stored operation path. In a case that a collision occurs, the method proceeds to step 2. In a case that no collision occurs, if the movement unit reaches the next operation grid, step 1 is repeated until all operation grids are traversed, and the method proceeds to step 5.

In step 2, a current grid where a collision occurs is marked as an obstacle. In a case that the current grid is the next operation grid, the next operation grid is removed from the operation path, the movement unit is controlled to return to a previous operation grid, and the method proceeds to step 4. In a case that the current grid is not the next operation grid, the method proceeds to step 3.

In step 3, it is determined whether the next operation grid is surrounded by grids that are marked as obstacles. In a case the next operation grid is surrounded by the grids that are marked as obstacles, the next operation grid is removed from the operation path, and step 3 is repeated. In a case the next operation grid is not surrounded by the grids that are marked as obstacles, the method proceeds to step 4.

In step 4, an obstacle-free path to the next operation grid, and returning to perform step 1 is determined according to obstacle information of a current grid map.

In step 5, boundary data of the new obstacle is stored.

Preferably, step 4 includes the following steps 4-1 to 4-3.

In step 4-1, marks of an upper grid, a lower grid, a left grid, and a right grid of the grid where the movement unit is located are checked by taking the grid where the movement unit is located as a center, for each grid of the upper grid, the lower grid, the left grid, and the right grid that is marked as being traversed, step 4-2 is performed.

In step 4-2, in a case that the grid that is checked in step 4-1 is the next operation grid, an obstacle-free path from the grid where the movement unit is located to a grid corresponding to a top of a stack is determined, and the method proceeds to step 4-3. In a case that the grid that is checked in step 4-1 is not the next operation grid, marks of an upper grid, a lower grid, a left grid, and a right grid of the grid that is checked in step 4-1 is checked by taking the grid that is checked in step 4-1 as a center, for each grid of the upper grid, the lower grid, the left grid, and the right grid that is marked as being traversed, step 4-2 is performed.

In step 4-3, the movement unit is controlled to move to the next operation grid along the obstacle-free path, and the method returns to step 1.

According to the present disclosure, the following effects can be achieved:

(1) information of obstacles can be acquired automatically, thus a high intelligence level can be realized, and the obstacles can be actively avoided in subsequent operations through only one time of leaning; and (2) learning can be performed autonomously for an obstacle newly added in the environment.

BRIEF DESCRIPTION OF THE DRAWINGS

The present disclosure is described in detail hereinafter with reference to the drawings and specific embodiments.

DETAILED DESCRIPTION

The technical solutions of the present disclosure are further described below with reference to the drawings, but the present disclosure is not limited to thereto.

First Embodiment

A self-learning method for an obstacle is provided in this embodiment, with which information of obstacles can be acquired automatically, such that the obstacles can be actively avoided in subsequent operations. In this embodiment, the technical solution is described in detail by taking a lawn mower as a model with a purpose of automatically determining the obstacles in the mowing region.

A current position and attitude of the lawn mower are acquired through a combination of positioning navigation and inertia navigation. The lawn mower moves forward under the driving of left and right wheels, controls steering via differential speed regulation, and control its movement with a movement control algorithm. A magnet is arranged on a casing of the lawn mower, and a Hall sensor is arranged inside the lawn mower to detect the change of the magnetic field to determine whether the casing of the lawn mower is deformed. If the casing of the lawn mower is deformed, it is determined that a collision occurs.

Figure 1:
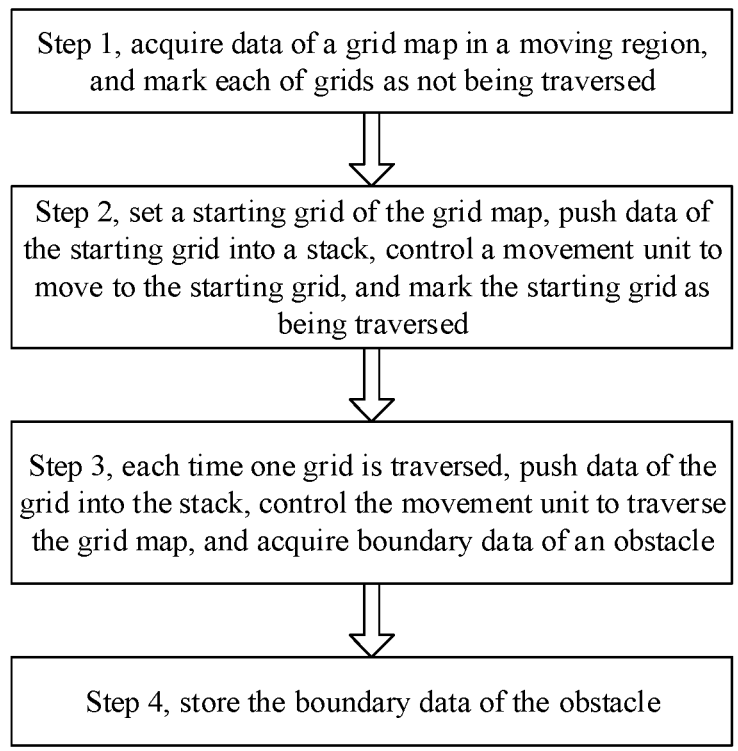
FIG. 1 is a schematic flowchart of a self-learning method for an obstacle according to a first embodiment of the present disclosure.

As shown in FIG. 1, the method in this embodiment includes the following steps 1 to 4.

In step 1, data of a grid map of a mowing region is acquired, and each of grids of the grid map is marked as not being traversed.

Specifically, the lawn mower acquires information of the mowing region, and the information of the mowing region includes a shape and a size of the mowing region. The mowing region is divided onto the grids, to obtain the data of the grid map, and the data of the grid map is stored in the lawn mower. In this embodiment, a size of a grid is the same as a size of a unit mowing area under the mower. Due to the existence of obstacles, it is impossible to determine whether each of the grids on the grid map can be reached, therefore, at first, each of the grids is marked as not being traversed.

In step 2, a starting grid of the grid map is set, data of the starting grid is pushed into a stack, a movement unit is controlled to move to the starting grid, and the starting grid is remarked as being traversed. To reduce a moving path of the lawn mower, a grid at a corner of the grid map is generally set as the starting grid.

In step 3, the movement unit is controlled to traverse the entire grid map, and boundary data of an obstacle is acquired based on marks of the grids in the grid map, where each time one grid is traversed, data of the grid is pushed into the stack, the grid is remarked as being traversed.

Figure 2:
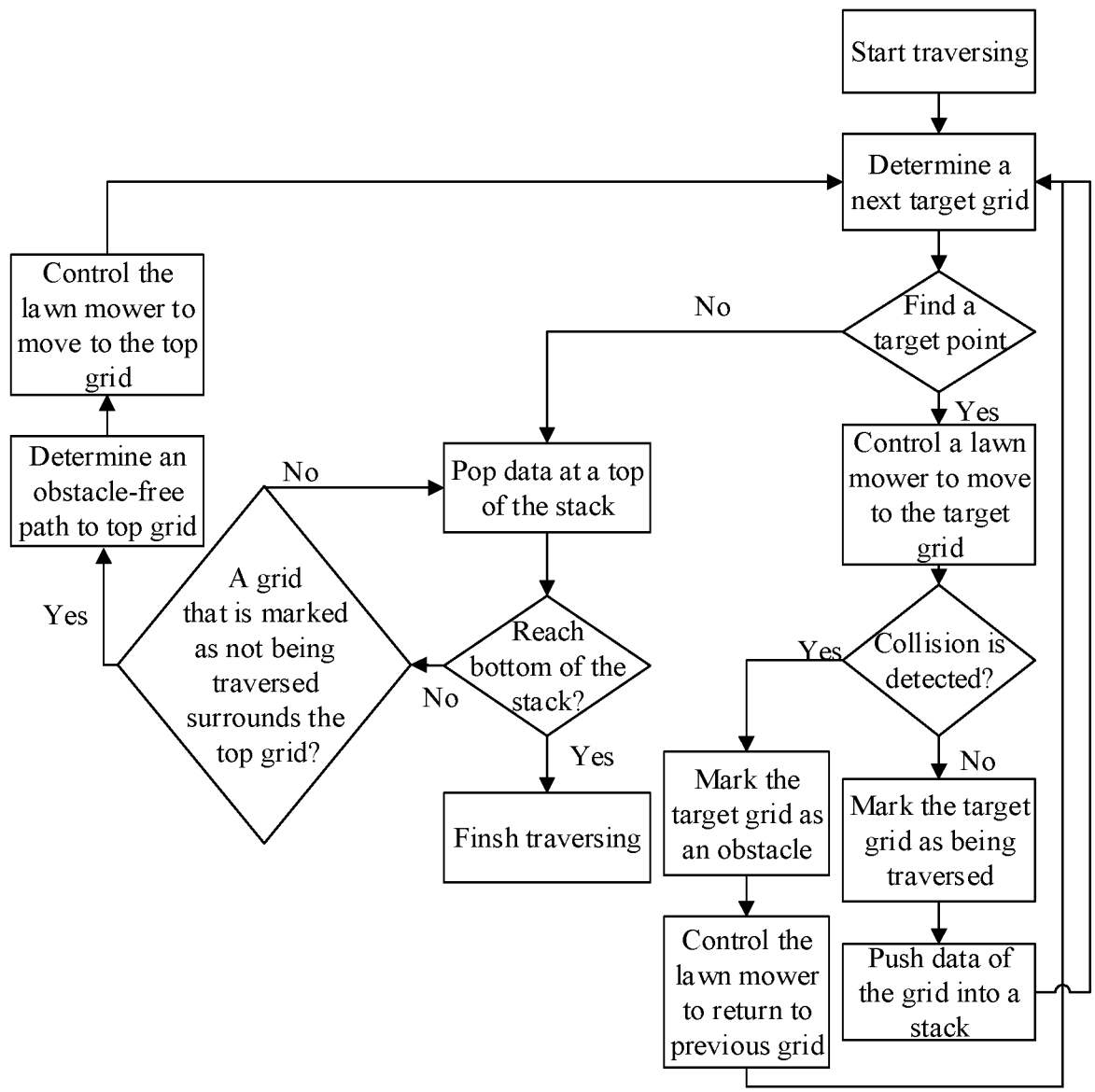
FIG. 2 is a schematic flowchart of step 3 according to the first embodiment of the present disclosure.

As shown in FIG. 2, step 3 indicates a whole process of the traversal, which includes the following steps 3-1 to 3-4.

In step 3-1, a grid corresponding to a top of the stack is taken as a center, and marks of the grids are checked sequentially to determine a next target grid. For example, an upper grid, a lower grid, a left grid, and a right grid of the grid corresponding to the top of the stack are sequentially checked. In the checking process, in a case that a grid is checked as not being traversed, the grid is taken as the target grid, the lawn mower is controlled to move to the target grid, and step 3-2 is performed. In a case that none of the grids is checked as not being traversed, that is, no target grid is determined, an element at a top of the stack is popped. If the number of elements in the stack is zero, that is, a bottom of the stack is reached, the traversal ends and step 4 is performed. If the bottom is not reached, step 3-3 is performed. In step 3-2, in a case that no collision occurs during a movement of the lawn mower to the grid that is checked in step 3-1, the grid is remarked as being traversed, data of the grid is pushed into the stack, and step 3-1 is performed. In a case that a collision occurs during the movement of the lawn mower to the grid that is checked in step 3-1, the grid is remarked as an obstacle, the lawn mower is controlled to return to a previous grid, and step 3-1 is performed. In step 3-3, a grid corresponding to the top of the stack is taken as a center, and marks of an upper grid, a lower grid, a left grid, and a right grid of the grid corresponding to the top of the stack are checked sequentially. In a case that there is a grid that is not traversed around the grid corresponding to the top of the stack, step 3-4 is performed. In a case that there is no grid that is not traversed around the grid corresponding to the top of the stack, an element at the top of the stack is popped. If the number of elements in the stack is zero, that is, the bottom of the stack is reached, the traversal ends and step 4 is performed. If the bottom is not reached, step 3-3 is performed. In step 3-4, an obstacle-free path to the grid corresponding to the top of the stack is determined.

Specifically, step 3-4 includes the following steps 3-4-1 to 3-4-3. In step 3-4-1, a grid where the lawn mower is located is taken as a center, marks of an upper grid, a lower grid, a left grid, and a right grid of the grid where the lawn mower is located are checked, for each grid of the upper grid, the lower grid, the left grid, and the right grid that is remarked as being traversed, step 3-4-2 is performed. In step 3-4-2, in a case that the grid that is checked in step 3-4-1 corresponds to the top of the stack, the obstacle-free path from the grid where the lawn mower is located to the grid corresponding to the top of the stack is determined, and step 3-4-3 is performed. In a case that the grid that is checked in step 3-4-1 does not corresponds to the top of the stack, the grid that is checked in step 3-4-1 is taken as a center, marks of an upper grid, a lower grid, a left grid, and a right grid of this grid are checked, for each grid of the upper grid, the lower grid, the left grid, and the right grid that is marked as being traversed, step 3-4-2 is performed. In step 3-4-3, the lawn mower is controlled to move to the grid corresponding to the top of the stack along the obstacle-free path, and step 3-1 is performed.

In step 4, boundary data of the obstacle is stored.

In this embodiment, data of the grid map is stored in a chip inside the lawn mower. A traversal path, namely, a moving path of the lawn mower, is set in the chip. The lawn mower performs a traversal check according to the set traversal path. During the traversal check, a grid with an obstacle is marked. If an obstacle is encountered, an obstacle-free path is determined. In a case that the entire grip map is traversed, all grids that are marked as obstacles are obtained. That is, complete boundary information of the obstacle is obtained and saved. In the subsequent mowing process, the lawn mower can actively avoid the obstacles based on the saved boundary information of the obstacle, without having to perform collision detection again, thereby improving the mowing efficiency.

Second Embodiment

Based on the first embodiment, a self-learning method for a new obstacle is provided in the second embodiment, with which information of a new obstacle can be automatically acquired, so that both an existing obstacle and the new obstacle can be actively avoided in subsequent operations. In this embodiment, the technical solution is described in detail also by taking the lawn mower as a model with the purpose of automatically detecting the new obstacle in the mowing region.

Figure 3:
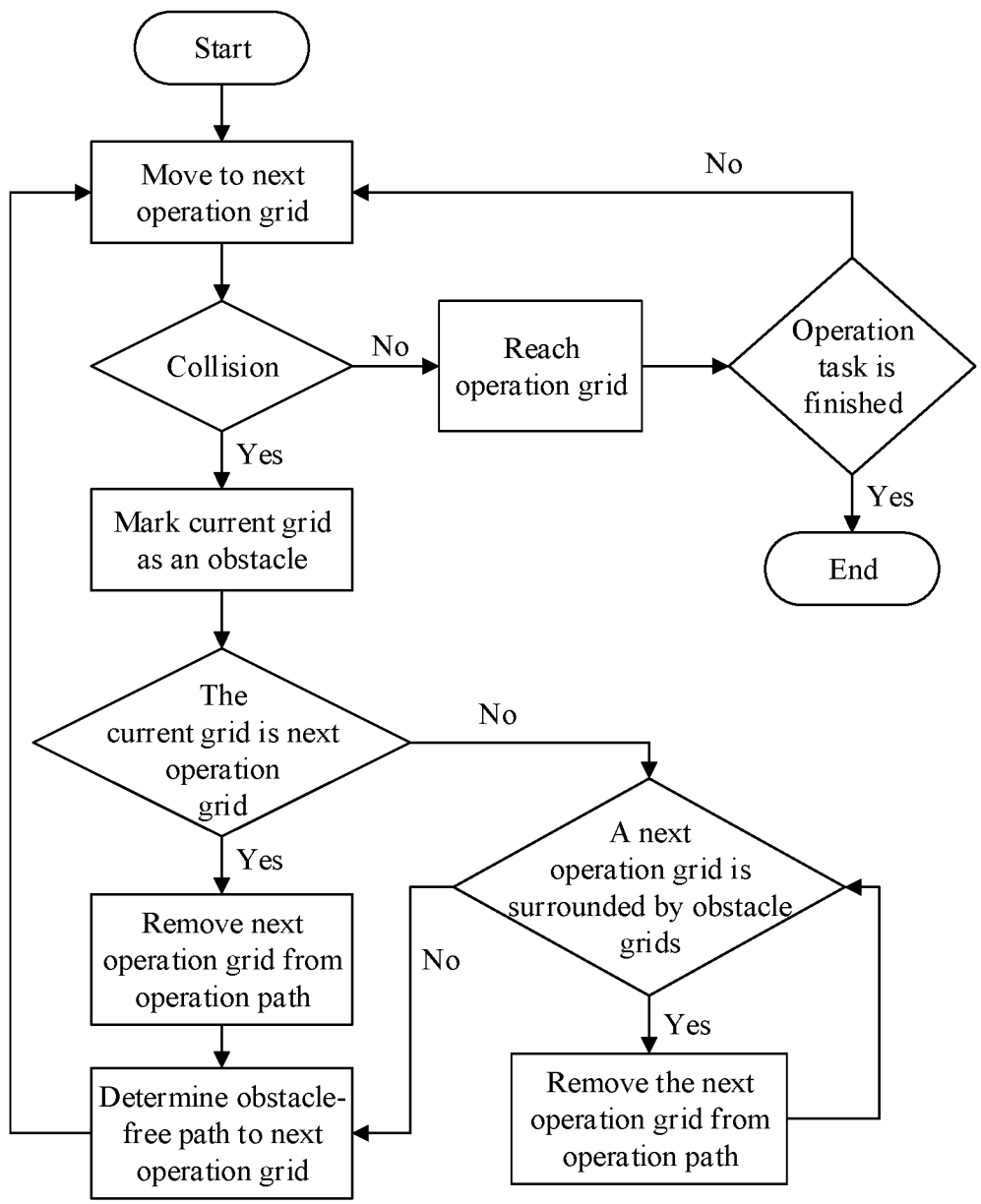
FIG. 3 is a schematic flowchart of a self-learning method for a new obstacle according to a second embodiment of the present disclosure.

As shown in FIG. 3, the self-learning method for a new obstacle includes the following steps 1 to 5. In step 1, a movement unit is controlled to move to a next operation grid along a stored operation path. In a case that a collision occurs, step 2 is performed. In a case that no collision occurs, if the movement unit reaches the operation grid, step 1 is repeated until all operation grids are traversed, then step 5 is performed. In step 2, a current grid is marked as an obstacle, and it is determined whether the current grid is the next operation grid. In a case that the grid is the next operation grid, the next operation grid is removed from the operation path, and the movement unit is controlled to return to a previous operation grid, then step 4 is performed. In a case that the grid is not the next operation grid, step 3 is performed. In step 3, it is determined whether the next operation grid is surrounded by grids that are marked as obstacles. In a case that the next operation grid is surrounded by the grids that are marked as obstacles, the next operation grid is removed from the operation path, and step 3 is repeated. In a case that the next operation grid is not surrounded by the grids that are marked as obstacles, step 4 is performed. In step 4, an obstacle-free path to the next operation grid is determined according to obstacle information of a current grid map, and step 1 is performed. In step 5, boundary data of the new obstacle is stored, and an operation task is finished.

Specifically, step 4 includes the following steps 4-1 to 4-3. In step 4-1, each of an upper grid, a lower grid, a left grid, and a right grid of the grid where the movement unit is located is checked by taking a grid where the movement unit is located as a center, for each grid of the upper grid, the lower grid, the left grid, and the right grid that is remarked as being traversed, step 4-2 is performed. In step 4-2, in a case that the grid that is checked in step 4-1 is the next operation grid, the obstacle-free path from the grid where the movement unit is located to a grid corresponding to the top of the stack is determined, then step 4-3 is performed. In a case that the grid that is checked in step 4-1 is not the next operation grid, the grid is taken as a center, each of an upper grid, a lower grid, a left grid, and a right grid of the grid that is checked in step 4-1 is checked, for each grid of the upper grid, the lower grid, the left grid, and the right grid that is remarked as being traversed, step 4-2 is performed. In step 4-3, the movement unit is controlled to move to the next operation grid along the obstacle-free path, and step 1 is performed.

Since there may be new obstacles in the mowing region, for example, a planted tree, if the lawn mower still mows according to the stored boundary information of the obstacle, the lawn mower will stop operating at a new obstacle. Therefore, in this embodiment, the lawn mower automatically updates the boundary information of the existing obstacle to the boundary information of the new obstacle. During the mowing of the lawn mower, if the lawn mower encounters a new obstacle, a corresponding grid is marked as a new obstacle and an obstacle-free path to the next operation grid is determined. The boundary information of the new obstacle is stored while finishing mowing. In this way, in the subsequent mowing process, the lawn mower can actively avoid obstacles based on the saved boundary information of the existing obstacle and the new obstacle without having to perform collision detection, thereby improving the mowing efficiency and intelligence of the lawn mower.

Those skilled in the art may make various modifications or additions to the specific embodiments described in the present disclosure or replace the specific embodiments in a similar manner, without departing from the spirit of the present disclosure or going beyond the scope defined by the appended claims.

The invention claimed is:

1. A self-learning method for an obstacle, comprising:
step 1, acquiring data of a grid map in a movement region, and marking each of grids of the grid map as not being traversed;
step 2, setting a starting grid of the grid map, pushing data of the starting grid into a stack, controlling a movement unit to move to the starting grid, and remarking the starting grid as being traversed;
step 3, controlling the movement unit to traverse the grid map, and acquiring boundary data of the obstacle based on marks of the grids in the grid map, wherein each time one of the grids is traversed, data of the grid is pushed into the stack, and the grid is remarked as being traversed; and
step 4, storing boundary data of the obstacle;
wherein the step 3 comprises the following steps:
step 3-1, checking, by taking a grid corresponding to a top of the stack as a center, marks of an upper grid, a lower grid, a left grid, and a right grid of the grid corresponding to the top of the stack sequentially, wherein
in a case that there is a grid that is marked as not being traversed, the movement unit is controlled to move to the grid, and the method proceeds to step 3-2, and
in a case that none of the grids is marked as not being traversed, an element at the top of the stack is popped, and wherein
if the number of elements in the stack is zero, a traversal for the movement region is completed, and the method proceeds to step 4, and
if the number of the elements in the stack is not zero, the method proceeds to step 3-3,
step 3-2, in a case that no collision occurs during a movement of the movement unit to the grid that is checked as not being traversed in step 3-1, remarking the grid as being traversed, pushing data of the grid into the stack, and returning to perform step 3-1, and
in a case that a collision occurs during the movement of the movement unit to the grid that is checked as not being traversed in step 3-1, remarking the grid as an obstacle, controlling the movement unit to return to a previous grid, and returning to perform step 3-1,
step 3-3, checking, by taking the grid corresponding the top of the stack as the center, marks of an upper grid, a lower grid, a left grid, and a right grid of the grid corresponding the top of the stack, wherein
in a case that there is a grid that is checked as not being traversed, the method proceeds to step 3-4, and
in a case that none of the grids is checked as not being traversed, an element at the top of the stack is popped, and wherein
if the number of elements in the stack is zero, a traversal for the movement region is completed, and the method proceeds to step 4, and
if the number of the elements in the stack is not zero, the method proceeds to step 3-3, and
step 3-4, determining an obstacle-free path from a grid where the movement unit is located to the grid corresponding to the top of the stack.

2. The self-learning method for an obstacle according to claim 1, wherein step 3-4 comprises the following steps:
step 3-4-1, checking, by taking the grid where the movement unit is located as a center, marks of an upper grid, a lower grid, a left grid, and a right grid of the grid where the movement unit is located, and proceeding to step 3-4-2 for each grid of the upper grid, the lower grid, the left grid, and the right grid that is marked as being traversed;
step 3-4-2, in a case that the grid that is checked in step 3-4-1 corresponds to the top of the stack, determining the obstacle-free path from the grid where the movement unit is located to the grid corresponding to the top of the stack, and proceeding to step 3-4-3, and in a case that the grid that is checked in step 3-4-1 does not corresponds to the top of the stack, checking, by taking the grid that is checked in step 3-4-1 as a center, marks of an upper grid, a lower grid, a left grid, and a right grid of the grid that is checked in step 3-4-1, and proceeding to step 3-4-2 for each grid of the upper grid, the lower grid, the left grid, and the right grid that is marked as being traversed; and
step 3-4-3, controlling the movement unit to move to the grid corresponding to the top of the stack along the obstacle-free path, and returning to perform step 3-1.

3. A self-learning method for a new obstacle performed based on a self-learning method for an obstacle, wherein the self-learning method for an obstacle comprises:
step 1, acquiring data of a grid map in a movement region, and marking each of grids of the grid map as not being traversed;
step 2, setting a starting grid of the grid map, pushing data of the starting grid into a stack, controlling a movement unit to move to the starting grid, and remarking the starting grid as being traversed;
step 3, controlling the movement unit to traverse the grid map, and acquiring boundary data of the obstacle based on marks of the grids in the grid map, wherein each time one of the grids is traversed, data of the grid is pushed into the stack, and the grid is remarked as being traversed; and
step 4, storing boundary data of the obstacle, and
the self-learning method for a new obstacle comprises:
step 5, controlling the movement unit to move to a next operation grid along a stored operation path, wherein
in a case that a collision occurs, the method proceeds to step 6, and
in a case that no collision occurs, if the movement unit reaches the next operation grid, step 5 is repeated until all operation grids are traversed, then the method proceeds to step 9;
step 6, marking a current grid where a collision occurs as an obstacle, wherein
in a case that the current grid is the next operation grid, the next operation grid is removed from the operation path, the movement unit is controlled to return to a previous operation grid, and the method proceeds to step 8, and
in a case that the current grid is not the next operation grid, the method proceeds to step 7;
step 7, determining whether the next operation grid is surrounded by grids that are marked as obstacles, wherein
in a case the next operation grid is surrounded by the grids that are marked as obstacles, the next operation grid is removed from the operation path, and step 7 is repeated, and
in a case the next operation grid is not surrounded by the grids that are marked as obstacles, the method proceeds to step 8;

step 8, determining, according to obstacle information of a current grid map, an obstacle-free path to the next operation grid, and returning to perform step 5; and step 9, storing boundary data of the new obstacle;

wherein the step 3 comprises the following steps:

step 3-1, checking, by taking a grid corresponding to a top of the stack as a center, marks of an upper grid, a lower grid, a left grid, and a right grid of the grid corresponding to the top of the stack sequentially, wherein in a case that there is a grid that is marked as not being traversed, the movement unit is controlled to move to the grid, and the method proceeds to step 3-2, and in a case that none of the grids is marked as not being traversed, an element at the top of the stack is popped, and wherein if the number of elements in the stack is zero, a traversal for the movement region is completed, and the method proceeds to step 4, and if the number of the elements in the stack is not zero, the method proceeds to step 3-3;

step 3-2, in a case that no collision occurs during a movement of the movement unit to the grid that is checked as not being traversed in step 3-1, remarking the grid as being traversed, pushing data of the grid into the stack, and returning to perform step 3-1, and in a case that a collision occurs during the movement of the movement unit to the grid that is checked as not being traversed in step 3-1, remarking the grid as an obstacle, controlling the movement unit to return to a previous grid, and returning to perform step 3-1;

step 3-3, checking, by taking the grid corresponding the top of the stack as the center, marks of an upper grid, a lower grid, a left grid, and a right grid of the grid corresponding the top of the stack, wherein in a case that there is a grid that is checked as not being traversed, the method proceeds to step 3-4, and in a case that none of the grids is checked as not being traversed, an element at the top of the stack is popped, and wherein if the number of elements in the stack is zero, a traversal for the movement region is completed, and the method proceeds to step 4, and if the number of the elements in the stack is not zero, the method proceeds to step 3-3; and step 3-4, determining an obstacle-free path from a grid where the movement unit is located to the grid corresponding to the top of the stack.

4. The self-learning method for a new obstacle according to claim 3, wherein step 8 comprises the following steps:

step 8-1, checking, by taking a grid where the movement unit is located as a center, marks of an upper grid, a lower grid, a left grid, and a right grid of the grid where the movement unit is located, and proceeding to step 8-2 for each of the upper grid, the lower grid, the left grid, and the right grid that is marked as being traversed;

step 8-2, in a case that the grid that is checked in step 8-1 is the next operation grid, determining an obstacle-free path from the grid where the movement unit is located to a grid corresponding to the top of the stack, and proceeding to step 8-3, and in a case that the grid that is checked in step 8-1 is not the next operation grid, checking, by taking the grid that is checked in step 8-1 as a center, marks of an upper grid, a lower grid, a left grid, and a right grid of the grid that is checked in step 8-1, and proceeding to step 8-2 for each grid of the upper grid, the lower grid, the left grid, and the right grid that is marked as being traversed; and step 8-3, controlling the movement unit to move to the next operation grid along the obstacle-free path, and returning to perform step 5.

5. The self-learning method for a new obstacle according to claim 3, wherein step 3-4 comprises the following steps:

step 3-4-1, checking, by taking the grid where the movement unit is located as a center, marks of an upper grid, a lower grid, a left grid, and a right grid of the grid where the movement unit is located, and proceeding to step 3-4-2 for each grid of the upper grid, the lower grid, the left grid, and the right grid that is marked as being traversed;

step 3-4-2, in a case that the grid that is checked in step 3-4-1 corresponds to the top of the stack, determining the obstacle-free path from the grid where the movement unit is located to the grid corresponding to the top of the stack, and proceeding to step 3-4-3, and in a case that the grid that is checked in step 3-4-1 does not corresponds to the top of the stack, checking, by taking the grid that is checked in step 3-4-1 as a center, marks of an upper grid, a lower grid, a left grid, and a right grid of the grid that is checked in step 3-4-1, and proceeding to step 3-4-2 for each grid of the upper grid, the lower grid, the left grid, and the right grid that is marked as being traversed; and step 3-4-3, controlling the movement unit to move to the grid corresponding to the top of the stack along the obstacle-free path, and returning to perform step 3-1.

6. The self-learning method for a new obstacle according to claim 3, wherein step 8 comprises the following steps:

step 8-1, checking, by taking a grid where the movement unit is located as a center, marks of an upper grid, a lower grid, a left grid, and a right grid of the grid where the movement unit is located, and proceeding to step 8-2 for each of the upper grid, the lower grid, the left grid, and the right grid that is marked as being traversed;

step 8-2, in a case that the grid that is checked in step 8-1 is the next operation grid, determining an obstacle-free path from the grid where the movement unit is located to a grid corresponding to the top of the stack, and proceeding to step 8-3, and in a case that the grid that is checked in step 8-1 is not the next operation grid, checking, by taking the grid that is checked in step 8-1 as a center, marks of an upper grid, a lower grid, a left grid, and a right grid of the grid that is checked in step 8-1, and proceeding to step 8-2 for each grid of the upper grid, the lower grid, the left grid, and the right grid that is marked as being traversed; and step 8-3, controlling the movement unit to move to the next operation grid along the obstacle-free path, and returning to perform step 5.

7. The self-learning method for a new obstacle according to claim 5, wherein step 8 comprises the following steps:

step 8-1, checking, by taking a grid where the movement unit is located as a center, marks of an upper grid, a lower grid, a left grid, and a right grid of the grid where the movement unit is located, and proceeding to step 8-2 for each of the upper grid, the lower grid, the left grid, and the right grid that is marked as being traversed;

step 8-2, in a case that the grid that is checked in step 8-1 is the next operation grid, determining an obstacle-free path from the grid where the movement unit is located to a grid corresponding to the top of the stack, and proceeding to step 8-3, and in a case that the grid that is checked in step 8-1 is not the next operation grid, checking, by taking the grid that is checked in step 8-1 as a center, marks of an upper grid, a lower grid, a left grid, and a right grid of the grid that is checked in step 8-1, and proceeding to step 8-2 for each grid of the upper grid, the lower grid, the left grid, and the right grid that is marked as being traversed; and step 8-3, controlling the movement unit to move to the next operation grid along the obstacle-free path, and returning to perform step 5.

* * * * *